UNITED STATES PATENT OFFICE.

WILLIAM B. HUGHES, OF PHILADELPHIA, PENNSYLVANIA.

METHOD OF MANUFACTURING STEEL.

SPECIFICATION forming part of Letters Patent No. 687,029, dated November 19, 1901.

Application filed August 19, 1901. Serial No. 72,501. (No specimens.)

*To all whom it may concern:*

Be it known that I, WILLIAM B. HUGHES, a citizen of the United States, residing in Philadelphia, Pennsylvania, have invented certain Improvements in the Manufacture of Steel, of which the following is a specification.

My invention consists of an improvement in the manufacture of steel by the open-hearth process, the object of my invention being to increase the production of the open-hearth furnace by decreasing the time necessary to perfect a heat therein.

Heretofore in the manufacture of basic open-hearth steel lime or limestone and iron oxid in the form of ore, scale, or cinder have been charged into the furnace, either with or without steel-scrap, and, after heating these materials to about red heat or to a point below the point of fusion, molten pig-iron has been introduced into the furnace, the result being the rapid production of a basic slag, which eliminates the phosphorus and silicon from the metal. Such slag or the bulk of it is then withdrawn and the bared bath then heated and further additions of oxid of iron are made as required until the carbon content of the metal has been reduced to the desired point and the metal brought to the temperature required for tapping. This process constitutes the subject of Ambrose Monell's Patent No. 652,226, dated June 19, 1900.

In the operations above described much time is lost in the act of heating the lime or limestone and oxid in the furnace before introducing the metal, and unless care is taken not to melt them in such heating injury to the hearth of the furnace is apt to result.

In carrying out my invention I introduce into a basic-lined open-hearth furnace the molten pig-iron to be refined, and I then charge thereinto a molten highly-oxidizing basic slag which has been prepared, as hereinafter described, by melting and fluxing a mixture of iron oxid and lime. The amount of slag employed may vary, depending upon the character of the iron which is being treated, and the proportions of iron oxid and lime in the slag may also vary, this being a matter which is within the judgment of the skilled metallurgist. Good results have been attained, however, with a slag containing eight parts of iron oxid and two parts of lime and equaling one-tenth of the weight of the molten pig-iron charge. As the molten iron is at the time the molten slag is charged into it at a relatively low temperature and high in carbon, the liquid slag at once reacts upon it, eliminating the silicon and also eliminating the phosphorus to the extent of eighty per cent., or thereabout, and within a short time— say within an hour from the time of charging the slag into the iron—the slag or the bulk thereof, with its contained impurities, is drawn off, thereby removing these impurities from the furnace and leaving the bath of metal nearly bare and in the most favorable condition to be rapidly heated to the high temperature required for tapping and for the elimination of carbon without chilling the bath. The heating of the metal is then continued, and further additions of the molten slag and, if necessary, of iron oxid alone are made in order to reduce the carbon and other metalloids remaining in the iron to the point desired in the finished steel. I may in some cases place on the furnace-hearth some iron oxid and lime with or without steel-scrap before charging the molten metal; but the use of at least a large part of the basic additions in the form of the premelted slag above mentioned I regard as important, although it is possible to carry out my invention by forming the highly-oxidizing basic slag in the open-hearth furnace by charging the lime onto the surface of the bath of molten pig-iron and then pouring into the furnace the proper quantity of molten iron oxid. The preferable plan, however, is to melt and flux together the lime and oxid, so as to form the highly-oxidizing molten basic slag, which can be poured into the bath of molten pig-iron on the hearth of the furnace.

By the practice of my invention I obtain an excellent quality of steel, and I avoid the waste of time heretofore required for heating the basic additions on the furnace-hearth and accomplish the desired result without any risk of injury to the hearth or lining. Moreover, the liquid slag acts more uniformly than if its constituents were charged into the furnace in a cold state, and in the reaction and discharge of slag the loss of uncombined oxid, which is sometimes carried off mechanically with the slag, is prevented.

To prepare the basic slag, which must be of a highly-oxidizing nature, I prefer to use a cupola-furnace, into which I charge the mixture of ore or other iron oxid and limestone, together with sufficient coke to bring them to a temperature which will melt them, but relatively so low that such melting will not be accompanied by a considerable reduction of iron from the oxid, which would be objectionable. The melted slag is tapped from the cupola as required, and the cupola is preferably of sufficient melting capacity to supply a number of open-hearth furnaces.

Having thus described my invention, I claim and desire to secure by Letters Patent—

1. The method herein described of making open-hearth steel which consists in providing the hearth of the furnace with a bath of molten iron, premelting, outside of the furnace, oxid of iron and mixing said molten oxid with lime to form thereby a highly-oxidizing liquid basic slag, bringing such molten slag into contact with the bath of molten iron on the hearth of the furnace so as to remove impurities from the iron, then withdrawing so much of the impurity-containing slag as may be necessary to permit of the rapid heating of the metal, and then reducing the carbon to the desired percentage and raising the temperature of the metal to the tapping-point, substantially as specified.

2. The method herein described of making open-hearth steel, which consists in providing the hearth of the furnace with a bath of molten iron, premelting, outside of the furnace, oxid of iron and mixing said molten oxid with lime to form thereby a highly-oxidizing liquid basic slag, bringing such molten slag into contact with the bath of molten iron on the hearth of the furnace, and substantially eliminating phosphorus and silicon from the iron while the latter is high in carbon and is at a relatively low temperature, then withdrawing so much of the impurity-containing slag as may be necessary to permit of the rapid heating of the metal, and then reducing the carbon to the desired percentage and raising the temperature of the metal to the tapping-point, substantially as specified.

3. The method herein described of making open-hearth steel, which consists in providing the hearth of the furnace with a bath of molten iron, premelting, outside of the furnace, and at a temperature only slightly above the melting-point, oxid of iron, and mixing said molten oxid with lime to form thereby a highly-oxidizing liquid basic slag, bringing such molten slag into contact with the bath of molten iron on the hearth of the furnace, and substantially eliminating phosphorus and silicon from the iron while the latter is high in carbon, and is at a relatively low temperature, then withdrawing so much of the impurity-containing slag as may be necessary to permit of the rapid heating of the metal, and then reducing the carbon to the desired percentage, and raising the temperature of the metal to the tapping-point, substantially as specified.

4. The method herein described of making open-hearth steel, which consists in providing the hearth of the furnace with a bath of molten iron, premelting and fluxing together, outside of the furnace, oxid of iron and lime to form a highly-oxidizing liquid basic slag, charging such molten slag into the bath of molten iron on the hearth of the furnace so as to remove impurities from the iron, then withdrawing so much of the impurity-containing slag as may be necessary to permit of the rapid heating of the metal, and then reducing the carbon to the desired percentage and raising the temperature of the metal to the tapping-point, substantially as specified.

5. The method herein described of making open-hearth steel, which consists in providing the hearth of the furnace with a bath of molten iron, premelting and fluxing together, outside of the furnace, oxid of iron and lime to form a highly-oxidizing liquid basic slag, charging such molten slag into the bath of molten iron on the hearth of the furnace, and substantially eliminating phosphorus and silicon from the iron while the latter is high in carbon, and is at a relatively low temperature, then withdrawing so much of the impurity-containing slag as may be necessary to permit of the rapid heating of the metal, and then reducing the carbon to the desired percentage, and raising the temperature of the metal to the tapping-point, substantially as specified.

6. The method herein described of making open-hearth steel, which consists in providing the hearth of the furnace with a bath of molten iron, premelting and fluxing together, outside of the furnace, and at a temperature only slightly above the melting-point, oxid of iron and lime to form a highly-oxidizing liquid basic slag, charging such molten slag into the bath of molten iron on the hearth of the furnace, and substantially eliminating phosphorus and silicon from the iron while the latter is high in carbon and is at a relatively low temperature, then withdrawing so much of the impurity-containing slag as may be necessary to permit of the rapid heating of the metal, and then reducing the carbon to the desired percentage and raising the temperature of the metal to the tapping-point, substantially as specified.

In testimony whereof I have signed my name to this specification in the presence of two subscribing witnesses.

WILLIAM B. HUGHES.

Witnesses:
WILL. A. BARR,
JOS. H. KLEIN.